Figure 1:
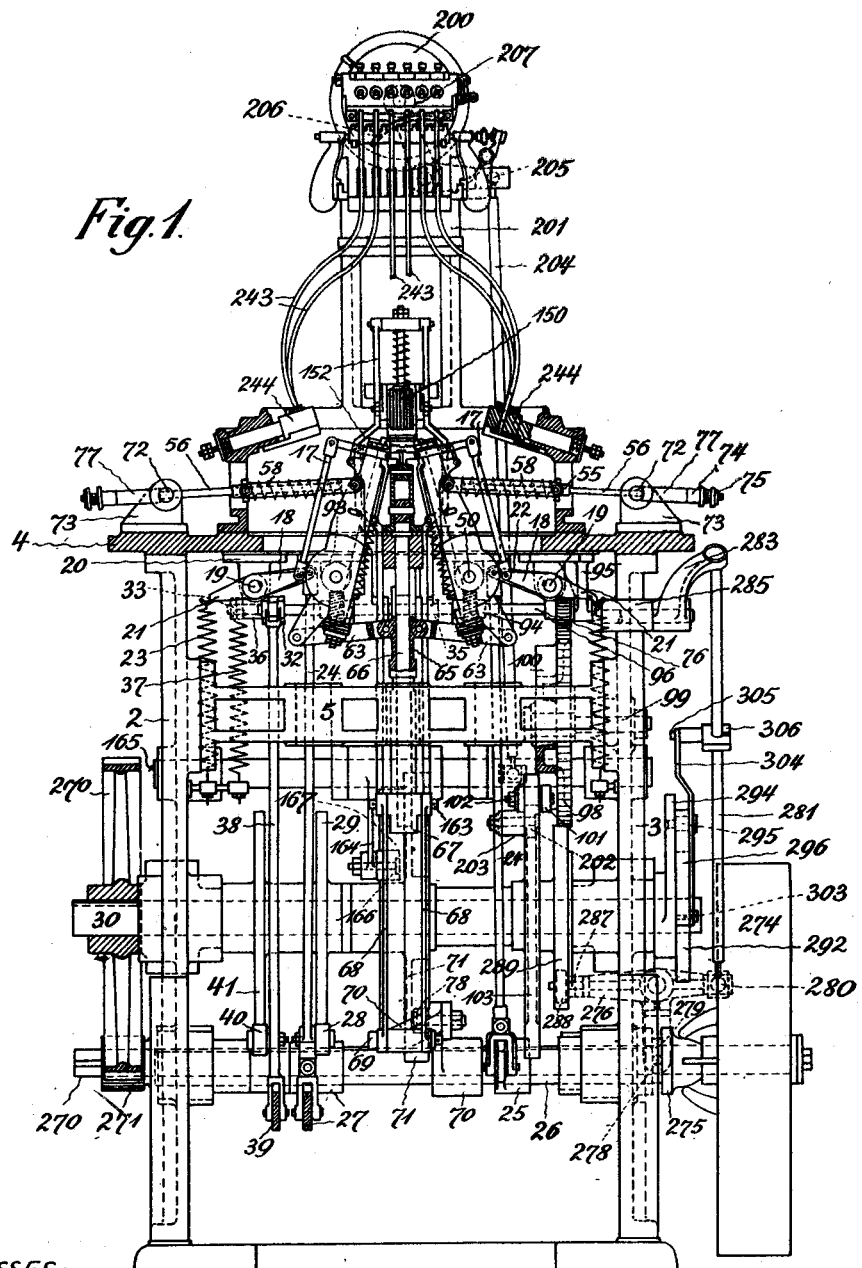

R. E. CRAIN & F. J. SCHARHAG.
PULLING-OVER MACHINE.
APPLICATION FILED JAN. 24, 1910.

1,051,561.

Patented Jan. 28, 1913.
11 SHEETS—SHEET 1.

WITNESSES:
INVENTORS:
ATTORNEY.

R. E. CRAIN & F. J. SCHARHAG.
PULLING-OVER MACHINE.
APPLICATION FILED JAN. 24, 1910.

1,051,561.

Patented Jan. 28, 1913.
11 SHEETS—SHEET 4.

WITNESSES:
Charles Junge
Wilhelm Berg

INVENTORS:
Rudolf Ernst Crain
Franz Joseph Scharhag
BY F. Dittmar
ATTORNEY.

R. E. CRAIN & F. J. SCHARHAG.
PULLING-OVER MACHINE.
APPLICATION FILED JAN. 24, 1910.
1,051,561.
Patented Jan. 28, 1913.
11 SHEETS—SHEET 5.
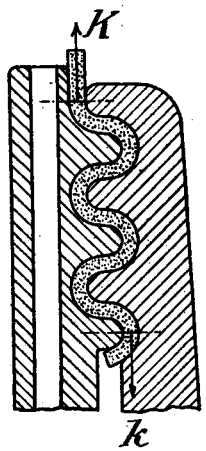
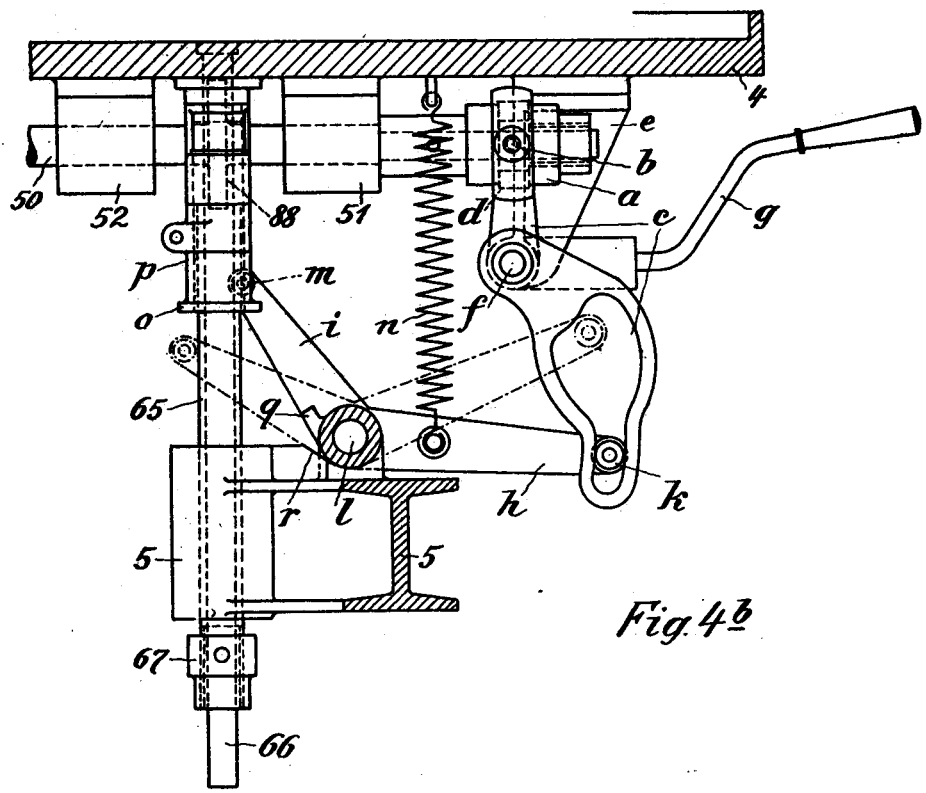

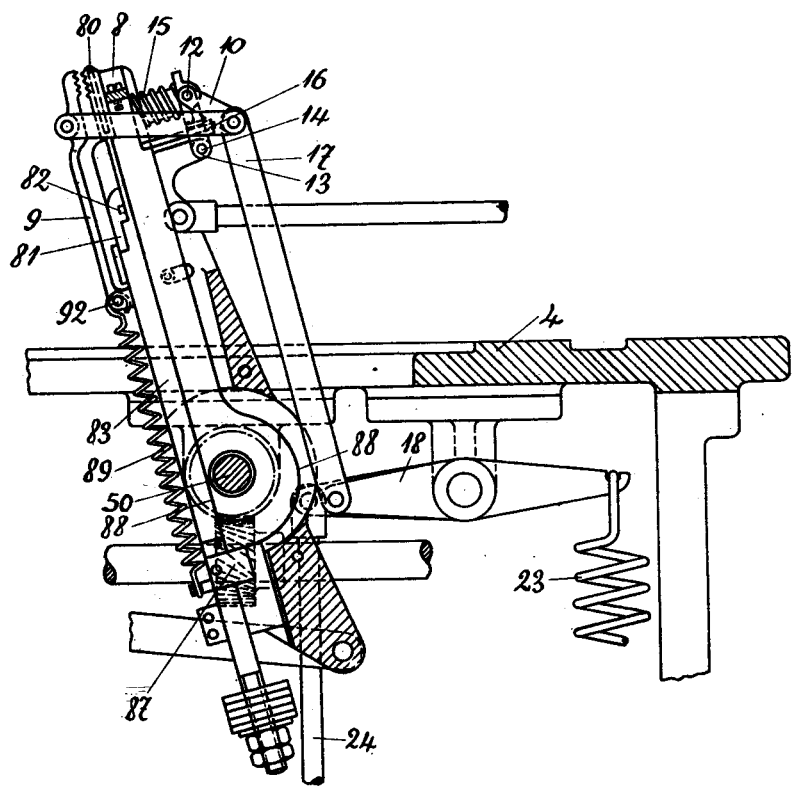

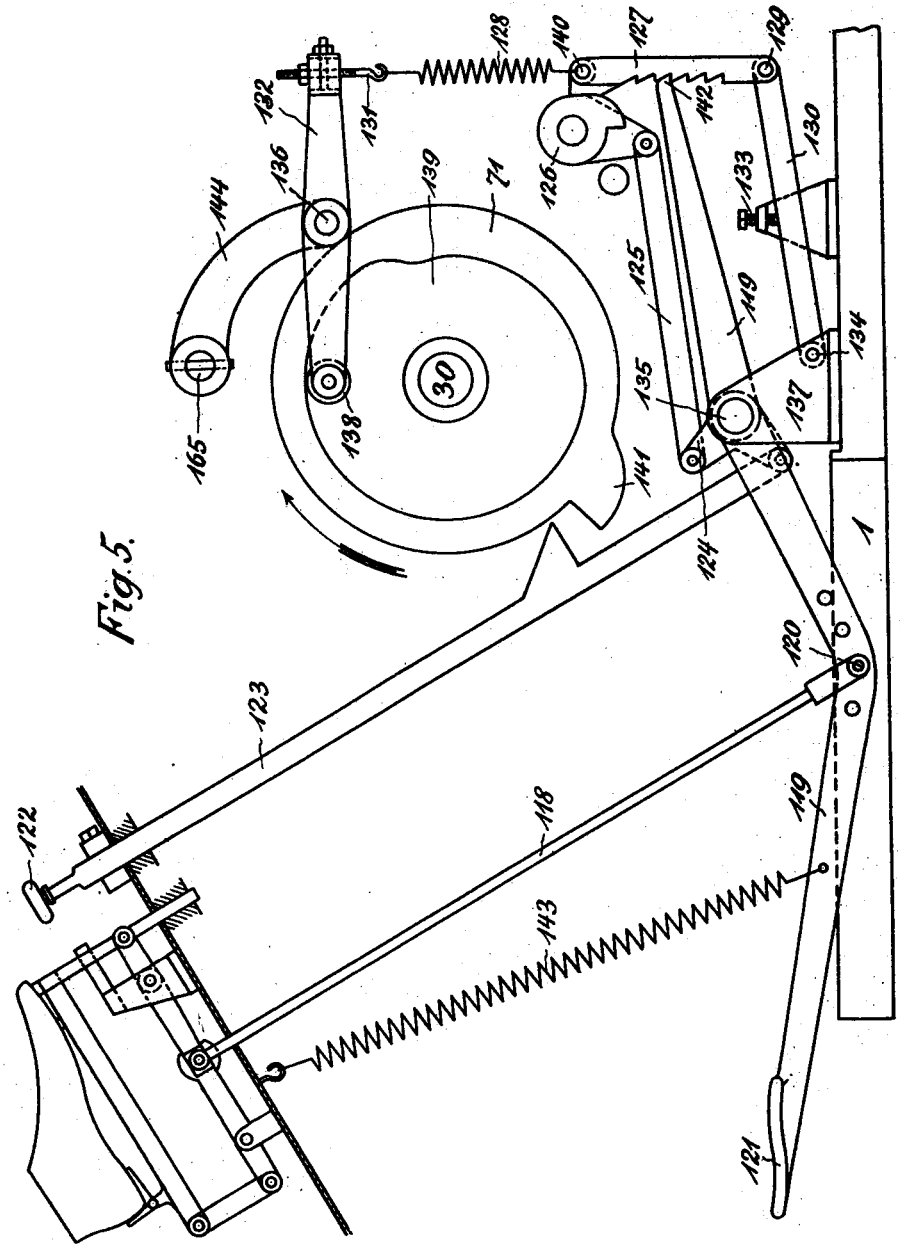

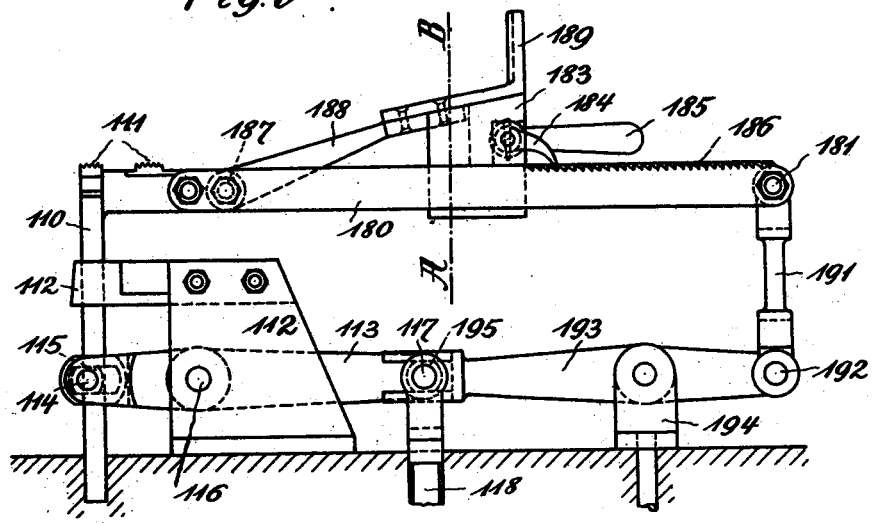
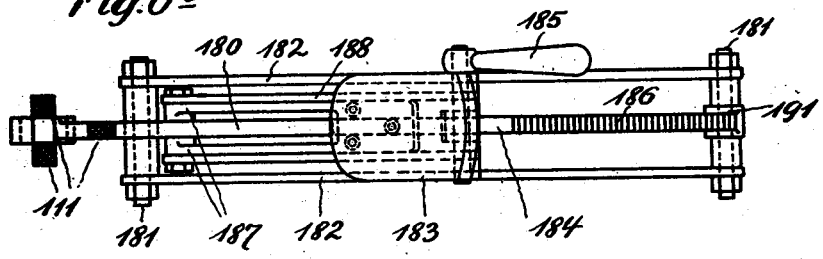

R. E. CRAIN & F. J. SCHARHAG.
PULLING-OVER MACHINE.
APPLICATION FILED JAN. 24, 1910.
1,051,561.
Patented Jan. 28, 1913.
11 SHEETS—SHEET 9.
Fig. 6ᶜ
Fig. 6ᵈ
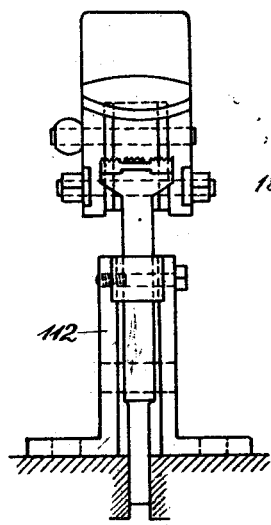
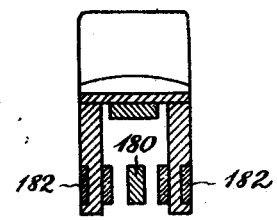
Section A-B.
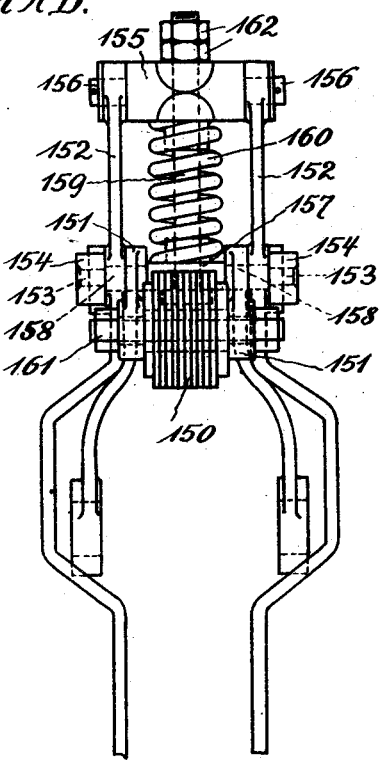
Fig. 7ᵃ
WITNESSES:
Charles Junge
Wilhelm Berg
INVENTORS:
Rudolf Ernst Crain
Franz Joseph Scharhag
BY F. Ditmar
ATTORNEY.

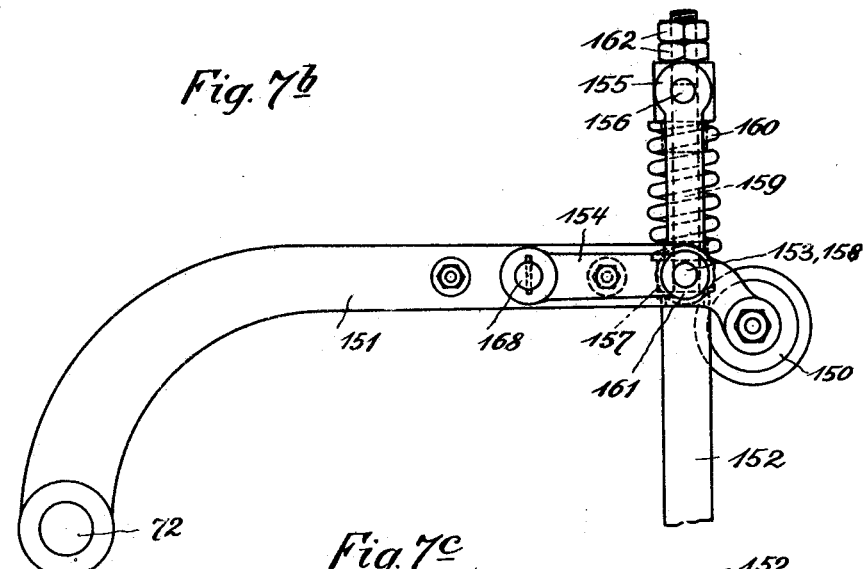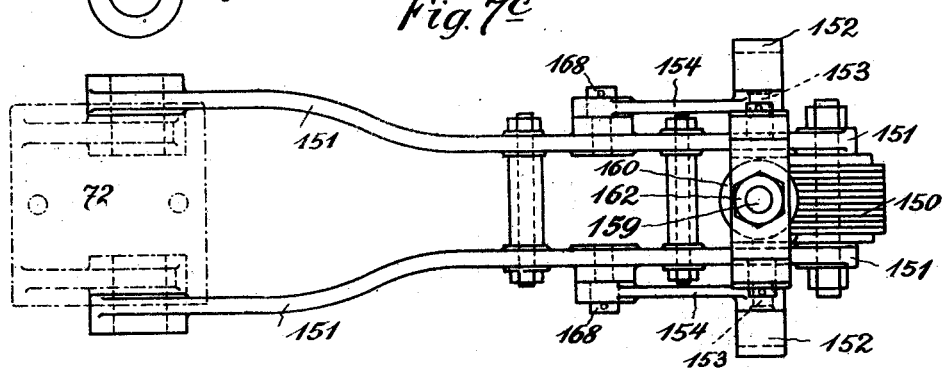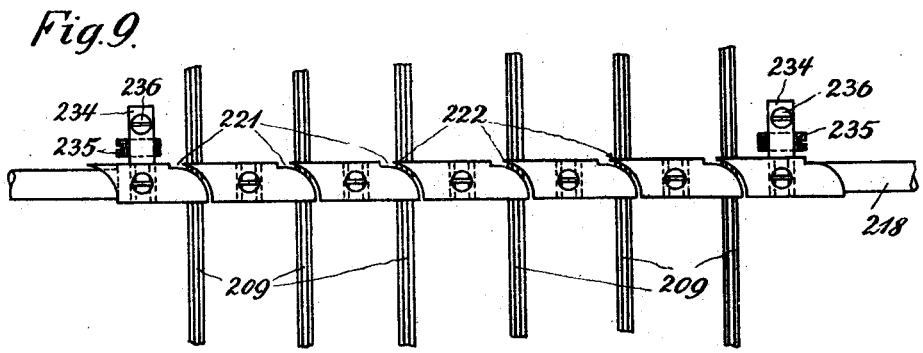

R. E. CRAIN & F. J. SCHARHAG.
PULLING-OVER MACHINE.
APPLICATION FILED JAN. 24, 1910.

1,051,561.

Patented Jan. 28, 1913.
11 SHEETS—SHEET 11.

WITNESSES:
Charles Junge
Wilhelm Berg

INVENTORS:
Rudolf Ernst Crain
Franz Joseph Scharhag
BY F. Dittmar.
ATTORNEY.

UNITED STATES PATENT OFFICE.

RUDOLF ERNST CRAIN AND FRANZ JOSEPH SCHARHAG, OF FRANKFORT-ON-THE-MAIN, GERMANY, ASSIGNORS TO MASCHINENFABRIK MOENUS A. G., OF FRANKFORT-ON-THE-MAIN, GERMANY, A CORPORATION.

PULLING-OVER MACHINE.

1,051,561.      Specification of Letters Patent.      Patented Jan. 28, 1913.

Application filed January 24, 1910. Serial No. 539,750.

*To all whom it may concern:*

Be it known that we, RUDOLF ERNST CRAIN, a subject of the Grand Duke of Saxe-Weimar, residing at 9 Sophienstrasse, and FRANZ JOSEPH SCHARHAG, a subject of the Grand Duke of Hesse-Nassau, residing at 100 Moltke Allee, both of Frankfort-on-the-Main, in the Kingdom of Prussia and Empire of Germany, have invented new and useful Improvements in Pulling-Over Machines, of which the following is a specification.

It is a fact well known by those engaged in the manufacture of boots and shoes that the machines employed for pulling the upper over the last and temporarily connecting it with the inner sole can only accomplish work capable of comparing favorably with hand work, if the automaticity of the machine is only carried to such an extent that the skill of the operator is still available. In machines hitherto in use for performing this part of the lasting operation the aforenamed fact has not been taken into consideration, or only to a very limited extent.

The present invention relates to a means for pulling over the uppers of boots, shoes, and the like, which for the first time confines the work of pulling over to its proper functions, and resolves the same into its component operations, carried out precisely in conformity with their technological signification, a clear distinction being made between such operations as cannot be withdrawn from the judgment and discrimination of the workman without reducing the quality of the work (critical operations) and such as require merely mechanical manipulations (mechanical operations).

Based upon these considerations the invention consists in first performing all the critical operations and then all the mechanical operations.

For carrying this invention into effect, use is made of a pulling over machine which preserves to the fullest extent the peculiar character of the critical operations, the latter being controlled by the workman, who can judge and rectify them in detail as well as in their total action as long as it is necessary to maintain their final effect, whereupon all the mechanical operations are accomplished in a perfectly automatic manner.

The operations required for the pulling-over in boot and shoe work comprise the following:—

1. The correct positioning of the upper on the last.
2. The proper gripping of the edge of the upper leather by means of pincers or the like.
3. The stretching of the upper over the last until the leather has received the proper set.
4. The turning of the edge of the upper over the edge of the last while the tension given to the upper is maintained, and laying the edge on the inner sole, and
5. The gripping and driving-in of the nails for fastening the edge of the upper to the bottom of the last or to the inner sole.

The above five steps comprise in general all the operations required for the efficient pulling-over, and the examination of their nature will show that the first three operations are of the critical kind, while the last two operations are of a purely mechanical kind.

We will first refer to the critical operations.

*1. The correct positioning of the upper on the last.*—This is one of the essential conditions for the proper work of pulling-over, and must be carefully looked after until the fastening of the upper on the last is proceeded with. In beginning the work of pulling over, the upper which by its cut represents approximately the geometrical development of the surface of the last should be placed in such position relatively to the last that a proper fitting of the same on the last is obtained. The means for testing this proper fitting is the human eye so that the perfect fitting of the shoe will always depend on the individual skill of the operator, it being impossible to provide for the automatic centering of the boot, or shoe, on the last which will answer as well, and be as reliable, as the skill of a workman. Inadequate gripping of the edge of the upper by the pincers, too strong or too weak a pull on the one or the other pincers, irregular tension of the upper and the like, can however altogether destroy the result of the efficient centering and therefore continued observation and correction of the position of the upper by a competent operator are required until all the critical operations are completed.

Since a really accurate cut of the upper is rarely to be found, and especially since the elastic qualities of the leather vary within the widest limits, automatic centering devices, which can only approximately replace the judgment of the human eye, are excluded. Accordingly all actions which are directed toward the correct positioning of the upper on the last and to the maintenance of the same, are critical operations.

2. *The proper gripping of the edge of the upper by means of pincers or the like.*— After the proper mounting of the upper on the last the edge of the upper is seized by pincers, or similar tools, the most important features being the manner in which and the position where the pincers engage the leather. With heavy leather for instance more of the edge of the upper is grasped so that it can be held in a sufficiently firm manner and does not tear. Light and delicate leathers are not held to the same extent in the pincers, so that the upper can be made smaller and a saving of the costly leather effected. Frequently it may be necessary, as in the case of a faulty cut that the leather should be held to a greater width in one pincers and not so much in the other pincers. It is of special importance that the pincers act on the proper part of the upper as on this particularly depend the amount and the quality of the lasting action in the pulling-over operation. These considerations, which vary almost with every shoe, can only be judged with sufficient accuracy by the workman, and taken into consideration during the pulling over operation, especially as irregularities do not manifest themselves at once but only during the course of the work. It is in consequence necessary to frequently release the pincers and attach them afresh, so as to obtain the desired result. From the preceding statements it follows that the gripping of the upper by pincers or the like is also a critical operation.

3. *Drawing the upper over the last until the set of the leather is obtained.*—If the pincers have taken a proper hold of the edge of the upper, a suitable movement of the pincers relatively to the last causes the upper to be drawn over the last with that definite strain which is sufficient to cause the parts of the upper subjected to the pull of the pincers to lie snugly on the surface of the last, so stretching the leather that a further pull might cause tearing. In the manufacture of uppers, the most diverse qualities of leather are used, as well as other substances such as felt, canvas, and the like. These materials differ greatly from each other in their elastic properties and even in the same kind of leather there are such variations in the elasticity of the material used that for fine boot or shoe work it is indispensable to pull over and last each individual shoe or boot exactly according to the elastic properties of its upper leather, that is to say, the leather should be pulled with a force of definite magnitude varying for each boot or shoe, so that the upper leather is in each case stretched a definite amount which varies with each boot or shoe. If this were not observed, the upper would either be torn or damaged in other ways during lasting, or it would not sit tightly enough on the last. Automatically pulling pincers can never meet these manifold requirements in the same manner as the hand operator. An adjustment of the pulling strain of the pincers would not alter this state of affairs as the amount of force required cannot be known in advance. The sensitive touch in the hand or foot of a workman, which becomes aware of every peculiarity of the elastic properties of the leather or other material instantly makes allowance for the same in the pulling over operation, is a quality which can never be imparted to an automatically working force. It is therefore obvious that this constitutes a critical operation of primary importance, which is by no means performed by the mere stretching of the leather. Indeed, the operator must during the pulling of the leather be especially careful not to pull the upper obliquely on the last. If however that does occur—and it is only avoided in exceptional cases—the upper must be brought back to its correct position and this can only be properly accomplished if the tension on the upper be fully or partly released and renewed as required after the upper has been re-adjusted as required. At the same time the previous critical operations are mostly repeated to a greater or less extent, and necessitate such a complicated interaction of all the critical operations needed for the perfect pulling over, that only the workman, utilizing every impression he receives in the course of the work for directing such actions, is capable of fully controlling the situation.

*The mechanical operations of the pulling over.*

4. *Turning the edge of the upper on to the edge of the last while maintaining the tension given to the upper and laying the edge over the inner sole and*

5. *Feeding, gripping and driving in the nails for fastening the edge of the upper on to the bottom of the last or the inner sole.*

If the upper has been pulled straight and correctly over the last, a perfect pulling over operation will be obtained, provided that care is taken to maintain the state of rest and to render it permanent. The operations to be thenceforth effected must be directed toward obtaining this definite state so that the work can be then completed without the need of the skilled workman. They have no technological object to fulfil and are, therefore, mere mechanical operations.

The processes hitherto usually followed in the pulling over can be divided into two groups. To the first belongs the pulling over by hand, which is frequently carried out in various ways as regards matters of detail, although in its main principles it is practically the same. A characteristic feature consists in the fact that the operator places the upper straight over the last and stretches it by the so-called "pulls" with pulling tongs, the effect of which is each time maintained by nailing firmly the edge of the upper on to the bottom of the last or the inner sole. The pulling and the tacking alternate and the sequence of the pulls as regards direction are not identical in all cases, but the small deviations are unimportant, such for example as whether the tacking or the pulling of the upper is first started with. The essential feature of the hand process is that the workman arranges his pulls as regards strength, direction, and points of application, in accordance with the consideration of the fact that the upper should be so manipulated, wherever possible, in three pulls, as to lie straight on the last, and to fit closely to the shape of the latter over as large an extent as possible, the state of tension obtained in this way and maintained temporarily by tacking leading to a permanent change of form.

The second group of pulling over operations is represented by the operations of the various pulling over machines. These all have for their object to cause the manipulations for effecting the engagement of the pincers with the leather to be performed automatically by the machine; even in these cases however some manipulations have still to be performed by the machine attendant. The result is an unsystematic series of pulling over operations effected without method, being partly automatic and partly effected by the operator regardless as to whether their nature is critical or mechanical, and the work so produced by these machines is very inferior to that done by hand.

According to the present invention we adopt for the first time operations based upon a scientific examination of the hand-method, which so coördinates the actions of pulling over that the machine actually produces the same effect as the handworker, even surpassing him. The operations will not of course correspond as regards the order of the steps in the hand operations, for the machine can multiply the two hands of an operator to any required extent, but as it cannot without difficulty correct the operations which the constantly varying conditions of the treatment of the upper demand, it becomes necessary to so contrive a mechanical pulling over operation that all the critical operations are combined in one interval of time, so that the necessary corrections can be effected before the machine accomplishes the subsequent operations which prevent such corrections being made. Accordingly, the new pulling over operation possesses the following characteristics: 1. The pulling over takes place in two separate intervals of time, in the first of which the critical operations take place, while in the second only the mechanical operations take place. 2. The whole of the critical operations can according to their nature be corrected at any time in their individual or their joint action until the whole effect resulting from this joint action is satisfactory. 3. It is only after all the critical operations have been satisfactorily effected that the mechanical operations are carried out. It will be apparent that this process possesses an important advantage over the hand process, inasmuch as the total effect of the whole of the critical operations can be rectified with the greatest ease, which is not the case with hand work, wherein the effect of each separate pull is maintained by the immediate tacking of the upper, which involves the risk of each separate pull requiring to be corrected again within the compass of the total effect of all the pulls.

The machine forming the object of this invention effects the pulling over process just described. It operates in two different periods, the first of which is unlimited as regards time, its duration depending on the general characteristics of the leather to be treated and the personal aptitude of the operator just as in hand work. Its independence as regards time is required, because during this period only critical operations are performed, the duration of which can never be foreseen if the object of complete work is to receive full attention. The nature of the critical operations determined by the operator and varying in their duration and sequence and which, if necessary, must be repeated until all the conditions for a perfect pulling over are fulfilled, excludes an automatic operation of the machine during this first period. Consequently the motor for driving the machine is, in accordance with this invention, disconnected during the period of the critical operations, the power and the regulation being effected by the operator. At the same time, only small demands are made on his strength and ability, the energy expended by him being multiplied and applied by the machine as required.

After completion of the period occupied by the critical operations their total effect is automatically maintained by the actuation of a suitable device, for example a push button, whereupon the machine, being released and thrown into gear, begins at once to execute the mechanical operations which are completed in a few seconds without requiring any intervention from the operator. After the completion of the period of the mechanical operations, the boot or shoe is automatically raised from the machine, until finally the machine is automatically brought to rest. This does not take place, as in the known pulling-over machines, always in the same position, but in consequence of a special adjustment, during the mechanical operations, it occurs sooner or later in that position of the machine in which it is possible to place the next upper to be pulled over on to the pincers, whether it be small or large. In consequence of this the operator can proceed with the pulling over of the next upper immediately the machine comes to rest. Further adjustments of the mechanical operations of the machine are only required when the size and form of the lasts change within wide limits or when uppers of entirely different material are to be dealt with.

In the operation of the machine the upper after being placed over the last is tacked, if necessary, by means of a pin to the inner sole at the heel. It is held by three pincers one of which is provided at the toe and the other two, one on each side. These pincers are kept constantly closed by the action of a spring, but can be opened at any time by pedals, preferably two, one of which operates the toe pincers, while the other pedal operates both the side pincers. In this way it is possible for the operator during the whole period of the critical operations to remove the leather from the pincers and to engage it again, if so required.

The operator first places the upper which he grasps with both hands in the vicinity of the instep so as to be properly centered in the toe pincers. If he does not succeed in doing this at once, he can by keeping his foot on the pedal hold the toe pincers open and so shift the upper to the right or to the left and place it more or less deeply in the jaws of the pincers until it sits as required. If he releases the pedal the upper is engaged by the pincers. The force with which the upper is held by the pincers can be varied within any required limits by constructing the pincers as hereinafter described so that even the stiffest leather is grasped firmly, while the most delicate leather is not damaged. The upper is then introduced in a similar manner into the two side pincers which are held open by the second pedal. Thus it can be adjusted to the right or left or on both sides forwardly or backwardly by pushing it optionally with the right, or with the left hand or with both hands and in like manner can be inserted into the pincers to a greater or less extent. The operator can also, as in most of the so-called bed lasting machines, set one of the side pincers farther forward or farther backward than the other side pincers, thereby controlling to a great extent the seating of the upper and the proper lasting effect of the pulling over. This adjustment of the side pincers at any place can also be effected by the operator during the whole period of critical operations. After the second pedal has been released the upper is firmly engaged by all three pincers and is now tightly stretched over the last by being pulled almost perpendicularly to the edge thereof, this being effected by means of a third pulling over pedal of the machine. When the operator depresses this pedal, the last is pressed into the upper with such a force that the upper from the toe to the instep, lies closely on the last and is fully stretched everywhere. By pressing more or less on the pedal the operator is in a position to adjust the pull exerted on the upper in accordance with the elastic properties of the latter. It is in this case of special value that he should be able to release at will the tension and renew it and feel with his hands, which are both free, whether the upper lies well and tightly everywhere on the last. If after being put on the last the upper should sit obliquely, the operator can reduce the tension and set either of the pincers at another place or in another way, or he can by pressing his foot on the pull over pedal maintain the tension to a similar or less degree and shift one or both pincers forward or backward to thereby shift the upper back to the right position, the toe pincers being in the open or closed position. If the upper fits correctly and firmly on the last, the operator presses a button or like device, whereupon the upper and last remain in their position and the pulling over pedal is released. This completes the critical operations. The operator then throws the machine into gear by means of a hand lever, whereupon the pincers travel automatically under the inner sole, thereby laying the upper leather over the edge of the last. At the same time the last is lowered, until it rests firmly on the pincers, and when it has reached this—its innermost position—it is pressed firmly on the pincers by a leather roller which bears on the toe of the shoe, this roller being designated hereinafter as the upper "last presser". Thereupon the side pincers each drive in two nails, while the toe pincers drive in one or two nails, these nails connecting the upper with the inner sole. The upper last presser then rises again and the pincers re-open to release the shoe and to allow it to be raised by the sole presser, so that the pincers can move outwardly without hindrance. The pincers remain stationary for a short time in their outer position until they are filled with nails when they again move inwardly to such an extent that their jaws stand nearly perpendicular under the edge of the last of the next shoe. Then the machine comes automatically to rest and the operator can proceed at once to place the next upper in position. If this be larger or smaller than the previous one, the operator, after throwing out the previous shoe, has only to turn a wheel a small degree, whereupon the machine comes to rest in another position corresponding to the size of the shoe.

In the accompanying drawing which forms part of this specification the invention is illustrated in detail.

Figure 2:
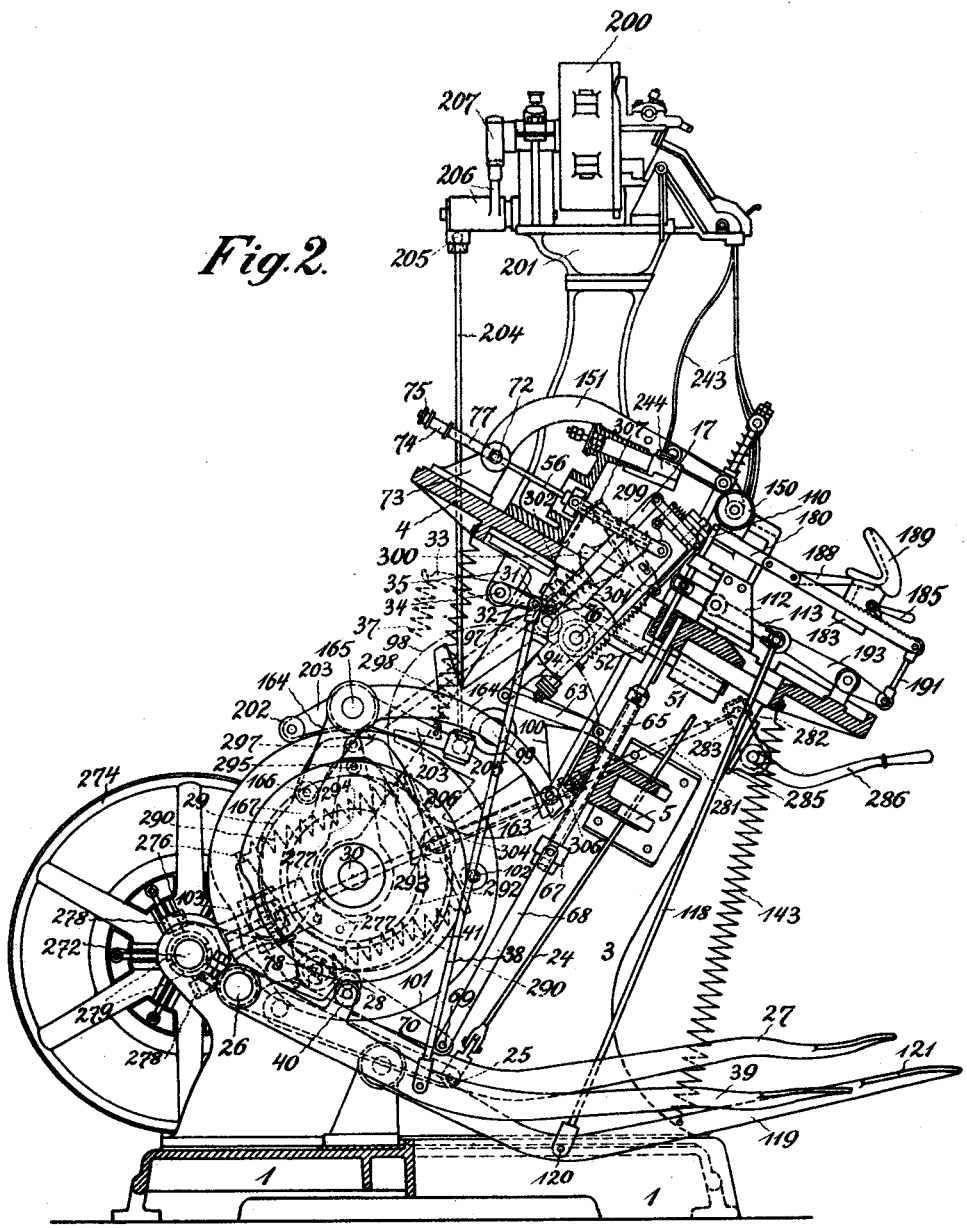
Figure 3:
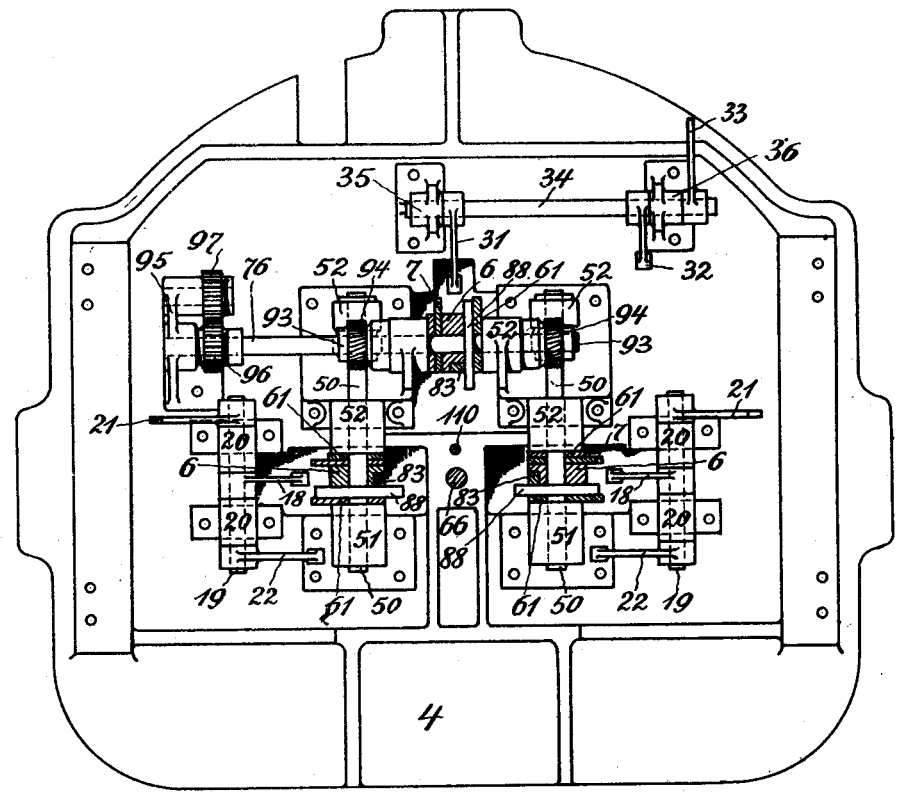
Figure 4:
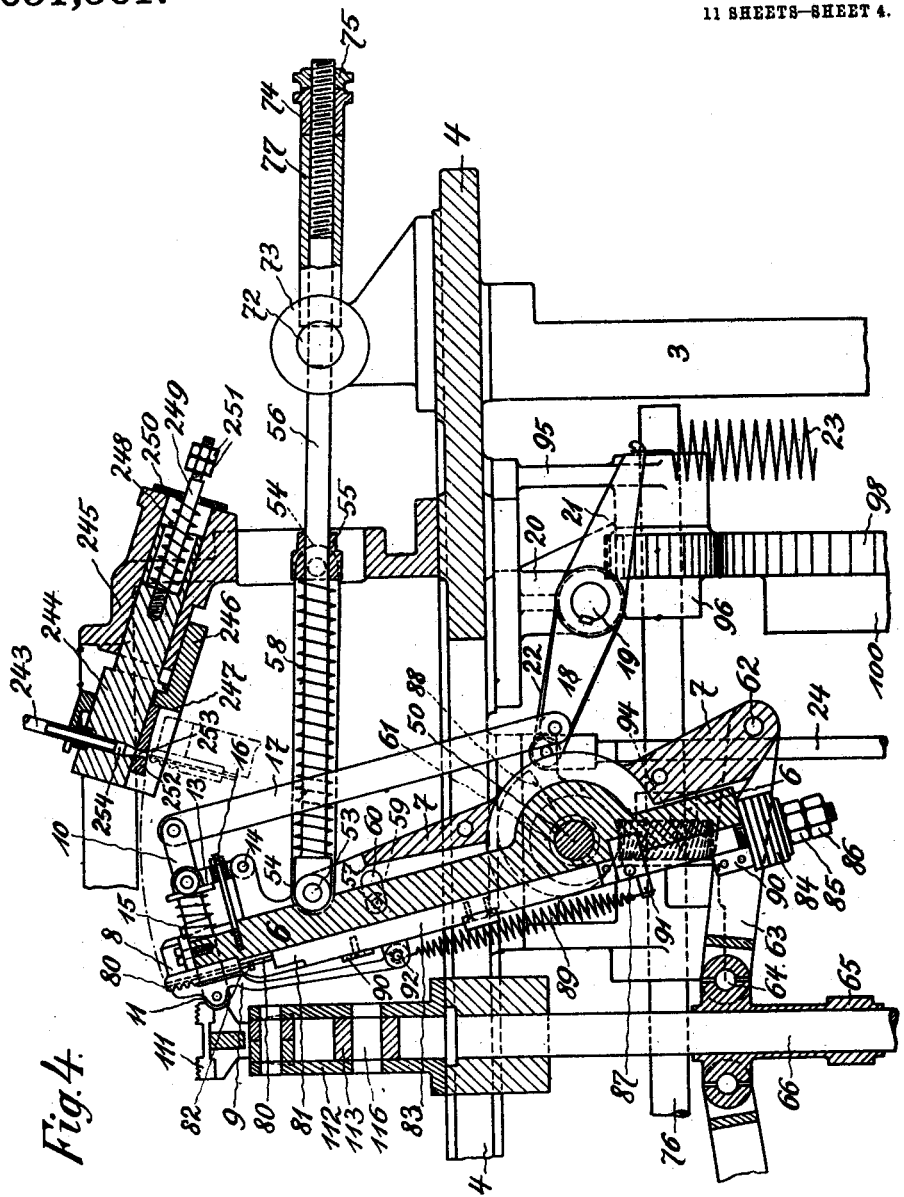
Figure 8A:
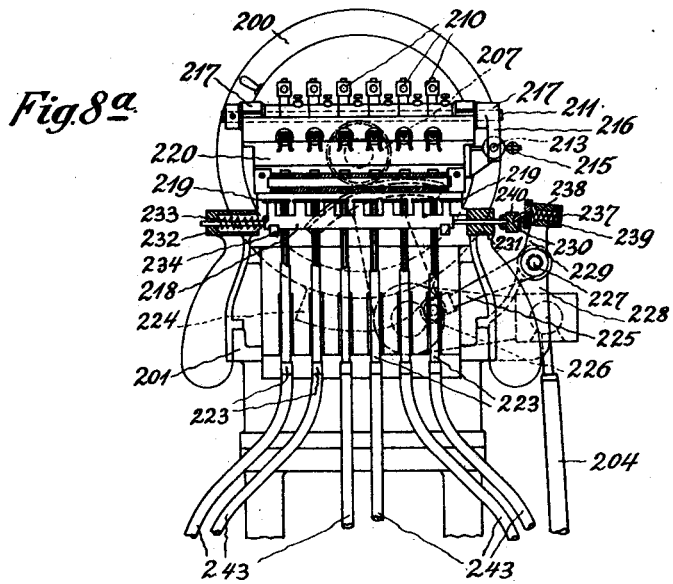
Figure 8B:
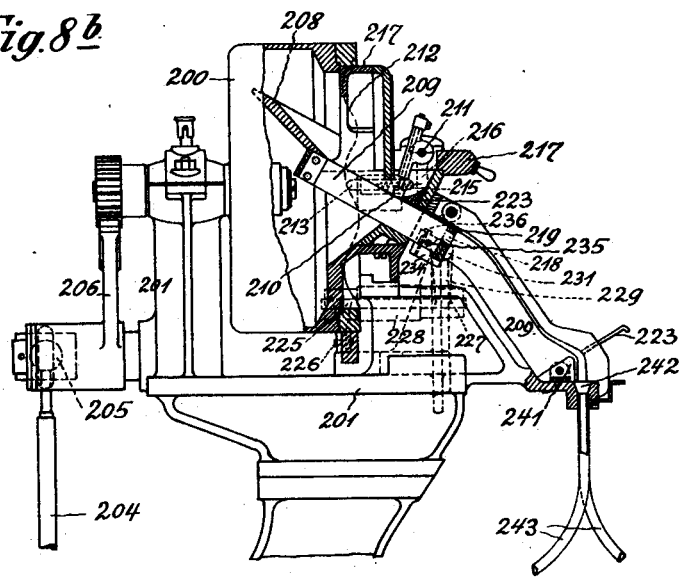

Referring to the drawing, Figure 1 shows a front view of the machine constructed according to this invention. Fig. 2 is a side view of the same, Fig. 3 is a view of the table from below, Fig. 4 shows separately the pincers and the gear connected to them and also the pincer-catchers and the nail feeding device. Fig. 4$^a$ shows the geometrical shape of pincer jaws with the leather in position. Fig. 4$^b$ illustrates the movability of the pincers in the longitudinal direction. Fig. 4$^c$ illustrates the pincers and their operative mechanism in side elevation. Fig. 5 shows the sole presser and gear connected thereto. Figs. 6$^a$ to 6$^d$ show the heel support and its connection with the sole presser. Figs. 7$^a$ to 7$^c$ show separately the upper last presser. Figs. 8$^a$ and 8$^b$ show the nail drum and the gear for the distribution of the nails. Fig. 9 is a plan view of the nail distributing slide.

*1. The pincers and their opening mechanism*, (Fig. 4.)—On a foundation plate 1 are two standards 2 and 3 which support the table 4 and are connected together by a cross stay 5 (Fig. 1). The table (Fig. 3) is provided with a longitudinal and a transverse slot. In the former swing the toe pincers and in the latter the two side pincers, these three pincers being all of the same construction. The pincers consist of a body 6 and the pincers' driver 7. The pincers body carries the pincers proper, formed by fixed jaw 8 (Fig. 4) and a movable jaw 9. The latter is pivotally mounted on the body 6 by means of the pin 92. Both jaws are toothed in longitudinal and transverse directions, the teeth however are not sharp as in most of the pincers or the like of lasting machines, but in accordance with this invention are made to present a sinuous profile as shown in Fig. 4$^a$.

Sharp teeth enter the body of the leather and hold it fast in the same way as hooks do, when it is almost impossible to prevent the leather being cut if not entirely torn at the places where the sharp edges of the teeth meet the leather, in which event the leather is no longer firmly held. In the present arrangement the profile of the teeth is sinuous as shown in Fig. 4, and gaps are so formed that they do not fit each other exactly, but are equidistant from one another by an amount corresponding to about the average thickness of the leather for which the jaws are to be used. The firm holding of the leather by means of these jaws is effected exclusively by the friction, which, owing to the special shape of the profile of the teeth, is increased to its greatest value possible for toothed jaws without the leather being thereby damaged or cut in any way. The holding power of these teeth is based on the well known laws of mechanics relating to the friction of ropes or belts coiled over drums or the like. As shown in Fig. 4$^a$ the arc of contact is 180° for each tooth, that is, the maximum value which it can attain in the present case. If it be assumed that the lowermost tooth holds the leather with a force $k$, then this force will be increased at each upper successive tooth to a degree depending on the magnitude of the arc of contact, so that for the number of teeth assumed in Fig. 4$^a$ the total force K is twenty times $k$. For very stiff leather the pitch of the jaw teeth is a coarse one, while a finer pitch is used for delicate leather.

The operation of the loose jaw 9 is effected by a link mechanism with a dead-point locking device when the pincers are closed. It consists of the pincers jaws 9, crank 10, coupler 11, and the relatively stationary web formed by the pincers body 6 and the link 13 attached thereto. The crank 10 is connected to the pincers body 6 by means of the link 13 and the pins 12 and 14. This crank is revolved downwardly about its pivot 12, which usually remains stationary, by the pull of the rod 17, the latter being jointed to the lever 18. In this manner the coupler 11 which engages with both sides of the pincers jaw 9, and the crank 10 are moved from their dead center position, crossing one another at an acute angle. This motion of the crank causes the pincers jaw 9 to swing about its pivot toward the left, thus opening the pincers. When the mechanism is in the dead center-position, coupler 11 can execute a movement either upwardly or downwardly. Owing to this arrangement the spring 15, which is compressed when the leather is engaged by the pincers, can be adjusted to exert any force required without offering any difficulty to the opening and closing of the pincers. It is only necessary to adjust the link 13 and spring 15 by means of the screw 16 so that the resistance of the movable jaw 9 on closing will not come into play until the mechanism is approaching its dead-center position. In this manner it is possible to close the pincers by a comparatively light spring 23 against the action of a heavy spring 15, and also to open the said pincers by means of the foot lever connected to the rod 24. The locking of the device in its dead-center position is attained, after the mechanism is brought into this position, by the holding effect of the spring 23. This spring prevents the mechanism from being moved out of its dead-center position, the treadle 27 connected to the rod 24 and carrying the roller 28, adapted to bear against the cam 29, thereby preventing the lever from moving farther. The screw 16 permits a certain amount of initial tension to be given to the spring 15, thereby determining the holding power of the pincers. If this holding power is to be increased, the length of the spring under initial tension can be reduced by the insertion of a small washer. In this way it is possible to regulate the holding power of the pincers within the widest limits. At the same time this arrangement of the pincers also presents the advantage that the pincers quite automatically grip thick leather which in pulling over requires a much stronger hold with a firmer grasp; in such a case the spring 15 has a greater tension in the dead center position of the pincers closing mechanism. The spring is made sufficiently strong so that small variations in the compression cause important variations in the tension. The power expended in closing the pincers is very small, as the gear used in connection therewith operates through a toggle arrangement. It is only necessary to compress the spring 15 by means of the screw 16 to such an amount that it offers resistance to the closing of the pincers only when the crank 10 approximates its dead center. By this means the pincers can be opened as easily as they can be closed, whether their holding power be great or small.

The forked rod 17 is jointed at its lower end to a lever 18 keyed on a spindle 19 (Figs. 4, 1 and 3). This spindle is pivotally mounted in brackets 20 on the table 4, and carries in addition to the lever 18 the two levers 21 and 22 which are likewise secured to it. To the lever 21 is attached a spring 23 secured to the standards 2 and 3 for holding the pincers closed, i. e. keeping the opening gear in the dead center position as will be hereinafter further described. The lever 22, as shown in Figs. 1 and 2, is jointed to a rod 24 which runs in a downward direction on the right hand side of the machine (Fig. 1) and is connected to a lever 25 secured to the shaft 26. On this shaft is keyed the pedal lever 27 from which the rod 24 is conducted toward the opening gear of the left hand side pincers.

If therefore the operator depresses the pedal 27, he thereby opens both side pincers at the same time, but if he releases the pedal both side pincers are closed under the action of the springs 23 (Fig. 4).

In order that the side pincers may open automatically after the shoe has been tacked, the lever 27 carries a roller 28 which runs on a cam disk 29 mounted on the main shaft 30 of the machine and makes with it one revolution during each full working cycle of the machine. At the proper moment the cam disk 29 presses the lever 27 and also the lever 25 downward through the medium of the shaft 26 and thereby opens automatically the side pincers causing them to close again during their outward movement. The curve of the disk 29 is of such shape that it keeps the pincers opening gear constantly in the dead center position, in which the roller 28 is kept pressed on it by the tension of the springs 23. If however the operator presses on the pedal of the lever 27, the roller is raised away from the cam.

The opening mechanism for the toe pincers is the same as that for the side pincers, only in this case the forked lever 17 is jointed to the lever 31 (Figs. 2 and 3) which like the levers 32 and 33 is keyed on the pincers opening shaft 34, which in its turn is pivoted in brackets 35 and 36 on the table 4. To the lever 35 is connected the toe pincers closing spring 37 which is attached at one end to the standard 2. From the lever 32 runs a rod 38 to the pedal 39 by means of which the operator opens the toe pincers, while it is closed by the spring 37. The lever 39 also carries a roller 40 running on a cam disk 41, which automatically opens the toe pincers in the same manner and at the same time as the side pincers closing them by the pull of the spring 37, and maintaining the opening gear of the toe pincers in its dead center position. In this case also the roller 40 is raised away from the curve when the operator actuates the pedal 39.

*2. The movement of the pincers*, (Fig. 4.)—The body 6 of the side pincers is pivotally mounted on the spindle 50 resting in bearings 51 and 52, the importance of which will be described farther on. The bearings 51 and 52 are bolted to the table 4. The pincers body 6 is embraced by the pincers' driver 7 of U-shape section (Figs. 4, 1 and 3) and is connected to it as follows: The two side jaws of the pincers-driver carry each at their upper part a pin 53 from which lead two symmetrically arranged pulling members 54. The members are jointed to the pin of a slide 55 on a guiding rod 56, which is jointed by means of pins 57 to the pincers body 6. In the relative position of the pincers body and pincers driver illustrated by Fig. 4, the axes 53 and 54 are coincident.

Around the rod 56 is a spring 58 which bears against the back of the fork of the rod 56 at the pin 57 and rests against the sliding piece 55. The pincers body 6 is also provided with a pin 59 which passes through a slot 60 in the cheeks of the pincers driver. If the spring 58 be supplied with an initial tension, it presses the pincers body 6 (right hand side pincers of Fig. 4) so far toward the left until the pin 59 lies against the left hand edge of the slot 60, as the pincers body and pincers driver accomplish a small relative motion on the axis of the spindle 50. In this way an elastic connection is provided between the pincers body and the pincers' driver, the yielding power of which can be varied as required by adjusting the tension of the spring 58. The purpose of this contrivance will be obvious from the following description: The pincers driving members have on both sides a hollow pin 61 through which passes the spindle 50 which is supported in the bearings 51 and 52. The pincers body and the pincers driver thus have co-axial pivots. The driving of the pincers is so effected by the pincers' driver that the pincers have an oscillating motion on the spindle 50. To effect this the pincers' driver 7 carries at its lower part and on both sides a pin 62 jointed to a forked rod 63 whose other end engages a pin 64 on a sleeve 65, which sleeve can slide along a guiding bolt 66 which bears at the top on the table 4 and at the bottom on the cross stay 5. On the sleeve 65 below the cross stay 5 is a nut 65' provided with pins 67 engaging two links 68. These links are pivotally connected at their lower end by a pin 69 to a lever 70 which is pivotally mounted on the shaft 26 and carries a roller 78 engaging with a cam disk 71. By means of this cam disk the lever 70 and sleeve 65 are so moved up and down that the pincers, which are all three connected in analogous manner as above described to the sleeve 65 by means of forked rods 63, accomplish a definite oscillating motion outward and inward on the axes of the spindles. In order to insure that the upper leather is really firmly pulled during the nailing operation, a toggle joint action is inserted in the pincers driving mechanism, the forked rods 63 being nearly at right angles to the axis of the sleeve 65, when they occupy their innermost position.

The transmission of the power exerted by the cam disk 71, from the pincers' driver to the pincers body is effected by the hereinbefore described connection by means of the spring 58 whose purpose it is to insure a uniform tensile stress on the leather during the inward motion of the pincers. This is of special importance when the pincers' driver is being driven inward with great force by the toggle-gear mentioned above, and the edge of the upper is already so stretched that it is not capable of further extension, and would only tear. In order to avoid this tearing, the guiding rod 56 extends through a hole in the pin 72 pivotally mounted in small bearings 73 provided on the table 4. The rod 56 is provided at its outer end with a screw thread and carries an abutment nut with lock nut 75. The abutment nut can be so adjusted by the operator that the pincers body only reaches a predetermined innermost position corresponding to the width of the last, while the pincers driver accomplishes the latter part of its movement and bears on the spring 58. This increased compression of the spring is not transmitted to the leather but is taken up by the bearings 73, as the nut 74 presses on a piece of tubing 77 which in its turn presses on the pin 72. In this way the movement of the pincers is accurately limited according to the size of the shoe, and a uniform adjustable limit of the stress on the leather which can never be exceeded during the automatic working period of the machine is obtained.

The driving of the second pair of side pincers is identical with the first already described, while the driving of the toe pincers is also effected in the same manner. But in this case the spindle 76 lies a little farther below the table 4 so that it passes under the two spindles 50. Its connection to the sleeve 65 is likewise effected by a rod 63.

In order to render possible the shifting, on the last, of the uppers when these are in a stretched or unstretched state, the present machine is so contrived that the side pincers can be shifted to and fro on the spindles 50, the connected rods for displacing and opening the pincers moving also with them. Fig. 4ᵇ shows the devices provided for effecting this shifting of the side pincers at any time during the critical operations. As already stated the side pincers are pivotally mounted on the spindles 50 (Fig. 4ᵇ), but can move in the longitudinal direction of the said spindles only with the latter owing to the provision of the cam disks 88 fixed upon the spindles (as hereinafter referred to). Between the bearings 51 and 52 supporting the spindle 50, these side pincers have as much play as is required for their movability. The shifting gear acts on the spindle 50 by means of a sleeve $a$ encircling it, and is capable of being shifted to the right or to the left by means of a collar $d$ pivotally mounted on a pin $b$ on the slotted lever $c$ when this lever oscillates to the right or to the left on its pivot $f$ which turns on a bracket $e$ fixed to the stationary table 4. Motion is imparted to the lever $c$ by the operator through the medium of a hand lever $g$ secured to $c$. The slot in the lever $c$ shown in Fig. 4ᵇ, together with the levers $h$ and $i$ serves to return the side pincers after being shifted to their middle position before they enter the pincers catcher 244, (Fig. 4) hereinafter more fully described. This is effected by making the slot of the link c, at those positions of the side pincers in which they have to be shifted, so wide that the required shifting can take place without its being prevented by the roller k of the lever h (see the dot and dash position of h and k). If however the side pincers have arrived at a definite position outside, the roller enters gradually the narrower part of the slotted lever which can thus be returned to its middle position together with the spindle 50 and side pincers.

The motion of the lever h which is mounted pivotally on a spindle l resting in brackets on the cross stay is effected by a lever i keyed to the spindle l. This lever i is provided with a roller m pressed constantly by a spring n on the collar o of a sleeve p screwed on the sleeve 65 of the pincers motion. While the part q of lever i is usually pressed on the corresponding support r on cross stay 5 by the pull of a spring n, collar o in its upward motion (i. e. in the upward motion of the pincers) carries with it the roller m and also the levers i and h to a definite position and effects during the movement of the levers h and i from their position shown in dash and dotted lines, the centering of the pincers when they reach the position shown in full lines.

The levers c and h are symmetrically located on both sides of the lever i and effect thereby the centering of each of the two side pincers.

*3. The nailing device*, (Fig. 4.)—After the pincers have reached their innermost position and the shoe is held fast on the pincers by the upper last presser, two nails are driven on each side, and one or two on the toe to fasten the upper leather to the innersole by means of the following device: The stationary jaw 8 is provided with one or two holes of about the diameter of the nail head which are filled up by a hammer 80. The hammers are connected by means of the pressure plate 81 and nose 82 firmly with the hammer handle 83 which can slide up and down in a longitudinal groove of the pincers' body 6, and is held outwardly by two guiding plates 90. It carries at its lower end several leather washers 84 which rest on a nut 85 and lock-nut 86. When the ends of the hammers 80 intersect the upper edge of the pincers jaw 8, the leather washers bear on the pincers body 6. The hammer handle 83 carries a projection 87 which engages with a cam disk 88 rigidly connected with the spindle 50 (Fig. 4), thereby raising the hammer rod. This puts in tension a spring 89 which at one end is attached to a pin 91 on the hammer rod 83 and at the other end to the bolt 92 which carries the loose pincers' jaw 9. On the spindle 50 being rotated, the locking projection on the disk 88 reaches the tappet, the hammer actuated by the spring 89 drives the nails lying on the hammers with heads downward so powerfully into the upper and innersole that they become riveted on the steel bottom of the last. In this case the upward stroke of the hammer is limited by the leather washers 84 which at the same time take up the momentum of the blow and deaden the sound. Thereupon the hammer rod is at once raised by the cam, the said spindle accomplishing in each working period of the machine a full revolution, which takes place during one sixth of a revolution of the main shaft 30.

The nailing device just described is applied in a similar manner to each of the three pincers and is actuated for all three by a single mechanism. For this purpose the two spindles 50 carry near the brackets 52 a helical wheel 93 (Fig. 3) meshing with a helical wheel 94 on the spindle 76 of the toe pincers, which helical wheels are supported by the brackets 52. The spindle 76 is prolonged on one side (Figs. 1 and 3) and near the standard 3 is further supported by a bracket 95 bolted to the table 4, carrying near the bracket a toothed wheel 96. With this wheel engages a second toothed wheel 97 of the same size, also rotating in the bracket 95, and driven by a wheel 98 which is six times its size (Figs. 1 and 2). The said wheel 98 is mounted on a pin 99 secured to the standard 3 and is provided with six radiating projections 100 against which bears a roller 101 which moves the wheel 98 one sixth of a revolution for each revolution of the main shaft 30, as it comes each time into engagement with one of the six projections. The roller 101 is mounted on a pin 102 which is screwed into a disk 103 keyed on the main shaft 30.

*4. The sole presser*, (Figs. 5 and 6$^a$ to 6$^d$.)—The stretching of the upper leather on the last is effected in such a manner that a presser bears from below against the inner sole and thereby forces the last into the upper while the latter is firmly held by the pincers standing nearly vertically below the edge of the last. This sole presser consists of a sliding piece 110 provided with an interchangeable head 111 (Figs. 1, 2, and 6$^a$ to 6$^d$). The sliding piece 110 is guided in the table 4 by its lower cylindrical shank— the shape of its head preventing a turning of the same—through a bracket 112 bolted to the table 4 and lies, during the insertion of the upper into the pincers, so low that this task can be easily performed. The lifting and lowering of the sliding piece is effected through a two-armed lever 113 which engages with the sliding piece 110 by means of a pin 114 and die 115, and is supported on the bracket 112 by means of the pin 116, while its free end carries a pin 117 from which a rod 118 runs to the pulling over lever 119 to which it is connected by the bolt 120. When the operator depresses the pedal 121 of the pulling over lever 119 while the machine is at rest, he presses the last into the upper with a force varying with the gear ratio which can be altered by shifting the bolt 120 to another hole so as to stretch the upper leather more or less while with both hands he tests the tension. If the upper fits the last to his satisfaction, he presses on the knob 112 (Fig. 5), thereby lowering the rod 123 and actuating the bell crank 124 pivotally connected to the foundation plate 1, so that through the medium of the rod 125 a cam disk 126 is turned to such an extent that the cam releases the rack 127. This rack is now pulled by the tension of the spring 128 which is attached to the rack 140 into a forward position, turning on the pin 129 of the link 130. In this position it engages with the pawl-shaped end of the lever 119 and holds the latter stationary in its present position by virtue of the tension on the spring 128. The object of this arrangement is to keep the tension, imparted to the upper by the operator, as constant as possible during the automatic working of the machine which is effected as will now be explained.

The spring 128 is attached to a bolt 131 on the two armed lever 132 and can as required be given an initial tension by the abutment screw 133 pressing down the link 130 from above. The link 130 is pivotally mounted on the pin 134 in the bracket 137 and the pulling over lever is pivoted at 135 to the same bracket, which is bolted to the foundation plate 1, while the lever 132 is pivoted by means of a pin 136 to the curved arm 144 secured to the stationary shaft 165.

As soon as the operator has finished the critical operations and thrown the machine into gear to work automatically, the pincers move approximately horizontally below the inner sole and draw the last vertically downward until the lap or edge of the upper be fully laid on the inner sole and the last bears firmly on all three pincers. If now the tension in the upper and especially the tension produced in the lap by the operator during the inner motion of the pincers is to be kept constant, the resistance which the last opposes in its descent to the motion of the pincers must decrease and theoretically become zero according to a law determined by the velocity ratio of sole presser and pincers as soon as the inner sole lies on the pincers. The latter part of the downward motion of the sole presser is in the present machine no longer left to the pincers pull, but provided for by an upper last presser (hereinafter described) which presses the sole presser so far downward against a resistance of definite magnitude, that the last rests firmly and securely on all the three pincers.

The decrease of the resistance of the sole presser as it exists at the beginning of the inward motion of the pincers, is obtained by causing the spring 128 to be distended in accordance with the aforesaid laws, while the last and consequently the locking rack 127 and the engaged locking tooth of the pulling-over lever 119 are lowered. For this purpose the two arm lever 132 carries at its left hand end a roller 138 which bears on a cam disk 139. This cam disk is keyed on the main shaft 30 and its contour is such that the roller 138 rises the same amount as the last sinks, and yet in such a manner that the pin 131 sinks more rapidly than the bolt 140, thereby causing a reduction of the tension on spring 128 and a reduction in the resistance of the sole presser. Small differences are compensated for by the elasticity of the spring 128.

After the nailing is effected and the pincers have opened for the release of the upper, the roller 138 is lowered again by the cam disk 139, thereby raising the locking rack 127 with the lever 119 and sole presser and shoe itself, so that the latter can be entirely liberated from the pincers jaws and removed by the workman without difficulty. At the same time the spring 128 is again put under its initial tension as the link 130 bears on the abutment screw 133. Shortly before the machine stops, the rod 123 is automatically lifted by a projection 141 provided on the cam disk 71, so that the locking rack 127 is disengaged from the pawl 142, whereupon the pedal of the pulling over lever 119 is raised again to its highest position by a spring 143 which is of sufficient strength to overcome the opposing weights. After the machine is stopped the operator can again use the pulling over lever 119 in the hereinbefore described manner.

5. *The upper last presser*, (Figs. 7ᵃ to 7ᶜ.)—In order to press the last firmly against the pincers during the nailing operation, an upper last presser is provided (as shown in Figs. 1, 2 and 7ᵃ to 7ᶜ) which consists of lamina-like leather disks forming a roller 150. This roller is mounted on the free end of an arm consisting of two links 151 pivoted on the pin 72 of the toe pincers (Figs. 7ᵃ to 7ᶜ). While the machine is at rest the roller 150 is at such a height above the pincers, that it does not stand in the way of the hand or sight of the operator. When the machine is thrown into gear, the roller begins to sink so as to bear on the toe end of the shoe just before the nailing operation is started, the roller leaving the toe end immediately after the hammer blow. The oscillating motion of the arms 151 is caused by the following arrangement.

Behind the roller 150 and on each side of the arm 151 are two uprights 152 perpendicular to the table 4. The said uprights 152 are connected by means of pins 153, links 154, and pins 168 to the arms 151. Above the arms 151 they are connected by a cross head 155, on the trunnions 156 on which they can turn. Opposite the crosshead 155 at the lower end of the links 154 is a similar cross-head 157 which is pivotally mounted in the arms 151. In the position shown in Figs. 7ª to 7ᶜ the pins 158 and 153 are co-axial. The two crossheads 155 and 157 are connected by a bolt 159 which can slide through holes in the crossheads, and permits of their coming nearer together against the action of a spring 160, while the collar 161 and the nuts 162 of the bolt 159 limit the movement of the cross heads apart from each other, giving a definite initial tension to the spring. As soon as the roller 150 lies on the shoe, the curved arms 151 remain stationary, while the parts 152 move slightly downward, being guided by the links 154. They pull the cross-head 155 in a downward direction, thereby compressing the spring 160, through which they exert a definite adjustable pressure on the crosshead 157 and roller 150, thus pressing the last against the pressure of the sole presser firmly on the pincers and keeping it in this position during the nailing operation. The uprights 152 are cranked outward just below the arms 151 to such an extent that they go around the toe of the shoe (Figs. 1 and 7ª). Below the shoe they are again bent inward so as to be nearer each other, so that they can pass through the slot in the table 4 through which swing the toe pincers, which allows the toe pincers to pass between them. Their lower ends are connected to the pin 163 of the lever 164 pivotally mounted on the stationary shaft 165. The shaft 165 rests on the side standards 2 and 3. The lever 164 carries a roller 166 which engages with a grooved path 167 in the cam disk 71. This cam disk is as already stated, keyed on the main shaft 30 and is provided on its right hand side with a groove for the motion of the pincers. The curve 167 causes the arm 151 to be raised and lowered periodically and the pressing roller 150 to be alternately lowered onto the toe end of the last and raised again.

6. *The heel support*, (Figs. 6ª to 6ᵈ.)— In order to prevent the last moving rearwardly during the pulling-over operation, under the pressure of the sole presser and during the inward motion of the toe pincers, there is provided, as in almost all so-called bed-lasting machines, a heel support which is so contrived that it rises and sinks to the same extent as the sole presser. The sole presser 189 is supported on a link 188 which can move freely upward and allow of a free adjustment of its inclined part in the longitudinal direction of the shoe. The object of this device is as follows:—After the last has been pressed firmly into the upper by means of the sole presser, it sinks when the pincers travel under the inner sole and finally rests, under the pressure of the upper sole presser, uniformly on the heads of the three pincers. This is an indispensable condition for a reliable tacking. As the three pincers heads are at the time of tacking nearly in a horizontal plane and the three bearing points 111 of the sole presser always form, when the latter rises or falls, a horizontal plane, care should be taken that the toe of the last sits on the three points 111 of the sole presser when the upper is put on the last, so that during the tacking operation itself the three pincers heads and three supporting points of the sole presser lie approximately in one and the same place. The last in the present machine adjusts itself as follows during the stretching of the upper on the last. As soon as the operator actuates the pulling over pedal and thereby presses the last into the upper which is held fast by the three pincers the last has the tendency to lay itself with its toe on the three bearing points 111 of the sole presser. But as the last when the upper is being placed thereon tends to move away in a rearward direction, it bears with great force against the heel supporting angle 189 and is so wedged by the friction resulting on the heel cap of the shoe that, on the last being raised for the purpose of pressing it into the upper the heel piece of the shoe is held back by the heel supporting angle 189, the last obliquely placed in the direction from front to rear and the toe of the last would be raised away from the front bearing points 111 of the sole presser, if the heel support were not raised in the same manner as the sole presser during the stretching of the upper. If the grasping of the upper by the pincers should result in the heel of the shoe (which during this operation rests with the heel support angle 189 on the sliding piece 183) lying so low that the toe of the last only bears on the rear supporting point 111 of the sole presser, the heel will rise at once when the upper is stretched, the link 188 moving upward on its pivot 187 so that the toe of the last cannot fail to bear fully on the sole presser, and is kept in this position by the simultaneous rising of the heel support and sole presser.

The arrangement of the heel support is as follows (Figs. 6ª to 6ᵈ): To the sliding piece 110 of the sole presser is attached above the guiding bracket 112, and at right angles to said sliding piece 110, a bar 180 which participates in the up and down movements of the sole pressers. The central bar 180 is connected by distance bolts 181 to two side bars 182 which act as a guide for a sliding piece 183. This sliding piece can be held firmly by means of the pawl 184 and handle 185 in any position on the central bar 180 which is provided with locking teeth 186, as the locking pawl 184, through its own gravity, and that of the handle 185 is kept in engagement with the locking teeth 186 on which the sliding piece 183 rests by virtue of its own weight on a path inclined at an angle of 30°. It resists all motion in an outward direction, while it can be shifted freely inward. The handle 185 serves to lift the pawl 184, thereby allowing the sliding piece 183 to move outward. To the sliding piece 183 is connected by means of two riveted rods, a pin 187 which carries the link 188. To the latter is secured the angle piece 189 which forms the heel support proper. When the upper is put on the last the angle 189 rests on the slide piece 183, but can be lifted freely from it during the course of the further pulling-over operations.

In order to avoid the outer end of the central rod 180 being bent downward or sidewise by any force or the guiding bracket 112 being damaged, this end of the rod is guided through a forked rod 191 which rests on a lever 193 held by a pin 192. This lever is pivoted in a bracket 194 bolted to the table 4, and its double forked beak-shaped left end (Figs. 6ª and 6ᵇ) slides on the blocks 195 which embrace the pin 117 on both sides of the lever 113. In this way a parallel guiding of the rod 180 effected by the levers 113 and 193 is obtained. This arrangement is operated by the pull rod 118 and raises and lowers the whole shoe in a reliable manner during the forcing of the last into the upper.

7. *The nail feeding device*, (Figs. 8ª, 8ᵇ and 9.)—The filling of the pincers with nails is effected as follows by devices generally known, (Figs. 8ª, 8ᵇ and 9:) A nail drum 200 resting on a stationary support 201 and filled with nails is swung to and fro once during each revolution of the main shaft 30 by means of cam disk 103, roller 202, the lever 203 pivoted on the stationary shaft 165, the rod 204 with ball joint 205, toothed segment 206 and small toothed wheel 207. The drum, by plates secured to its inner surface, raises the nails and pours them once to the right and once to the left onto a tray 208 inclined forwardly and provided with six grooves through which some of the nails slide into six channels 209 made of steel. The nails are arranged in rows in the well known manner by a tripper 210 which travels frequently over the channels so that the nail shanks hang between the two plates of a channel while the nail heads rest on the top. The motion of the trippers 210 which are secured to a spindle 211, is imparted by a curved surface 212 arranged on the front side of the nail drum 200; a pin 213 sliding on the curve and guided by a stationary bracket 214 acts on a crank arm 216 subject to the pressure of a spring 215 and secured to a spindle 211. The spindle 211 is pivoted on both sides of the trippers 210 in a small stationary frame 217. The six inclined rows of nails thus formed bear against the distributing slide 218 (Fig. 9), which is similar to the well known distributing slides. It consists of a comb-like slide 218 terminating in cylindrical spindles and having attached to its upper part the distributing plates 219 whose upper limiting surface is flush with the upper edge of the channel plates. Between the individual plates 219 are provided oblique channels 220 having a width about equal to the diameter of the nail shank and through which the nails can slide in the same manner as they do through the channels 209. If the slide 218 is in its right hand end position the rows of nails rest on the upper edge of the distributing plates. If however it be shifted to its left hand end position, the rows of nails bear on the upper edge of the distributing plates and slide down onto the parts 221 provided on the distributing plates, which parts provide a space for the foremost nail of each row. Thereupon the slide 219 reverses its motion, the points 222 of the distributing plates pushing between the shanks of the first and second nails of the row and holding back the second nail and the row behind it, while the foremost nail is driven out of its rest and enters the oblique channels 220 and is driven downward positively by the latter. If the slide is again shifted to its right hand position the end of the oblique channels 220 opens into the channels 209 and the six allotted nails slide down under the momentum imparted to them by the channels 220 and of their own weight into the channels 209. As these channels are closed from the trippers 210 down to the bottom by covers 223, which allow the nail heads to slide down without sticking, a jumping of the nails out of their channels 209 is prevented.

The motion of the distributing slide 218 originates from a projection 224 on the drum 200 on which runs a roller 226 pivoted to the crank arm 225. The arm 225 is secured to a spindle 227 which is pivotally attached to a stationary bracket 228 and carries at its forward end a crank arm 229 which by means of the pin 230 drives the distributing slide 218 toward the left. The slide 218 rests with its cylindrical ends in sliding bearings in the fixed brackets 231 and 232 and is pressed back to the right by a spring 233 arranged within the bracket 232, as soon as the nail drum 200 reverses its motion, the roller 226 leaving the projection 224. An exact adjustment of its end positions is of importance in securing reliable working of the distributing slide 218 so that on the one hand the foremost nail falls with certainty into the part 221, the points of the distributing plate holding back the nails which are pushing forward, and that on the other hand the oblique channel 220 opens exactly downward into the main channel 209, so that a wedging of the nails at the overhanging part cannot take place. In order to effect these two adjustments independently of each other in the present machine a plate 234 is secured to each end of the slide 218 and carries an adjusting screw 235. As this meets the outermost channel 209 it acts as a stop which exactly limits the stroke of the distributing slide either in one way or the other and permits of lengthening or shortening the stroke as required. The adjusting screw 235 is maintained in its position after the adjustment by means of a clamping screw 236.

In order that on the striking of the screw 235 the operating rods shall always make the same stroke, the arm 229 is constructed in the following manner: The upper hub or boss is bored through so that a shoulder is left on the inner side, against which a small cup 238 is pressed by a spring 237. The right hand end of the spring bears against a cover 239 screwed on the boss. On the small cup 238 a pressure pin 230 bears, which pin engages at its left hand end with bell-shaped member 240 slipped over the cylindrical part of the distributing slide 218. The spring 237 has an initial tension sufficiently strong to overcome the pressure of the spring 233 without being itself compressed. If however the abutment screw on the right comes into contact with the outermost right hand channel 209, the spring 237 yields to such an extent that the part 224 drives out pressure pin 230 over the abutment position of the slide 218. The backward motion of the slide 218 caused solely by the force of the spring 233 is directly limited by the left hand abutment screw 235. The springs 233 and 237 also fulfil the object of yielding when anything interferes with the moving of the slide, thereby preventing breakages and damage of any kind.

After the nails have been distributed by the slide 218 they slide downward into the channels 209 as already stated until they reach the abutments 241. These hold back the nail shanks while the heads proceed farther forward. In this way the nail is caused to turn over, and falls with its head forward into the opening 242. Covers 223 prevent the nails jumping out of the passages 209 when they turn over. Tubes 243 of small bore leading in pairs to the ends of the three pincers are attached to the openings 242, through which the nails reach the pincers catchers 244. These catchers (Fig. 4) each consist of a die-shaped head into which the said pipes 243 open, and of a cylindrical body which can slide in an opening provided in the stationary part 245 of the table. To prevent a rotation of the cylindrical part a guiding plate 246 is screwed to the head of the pincers catcher, and this guiding plate lies on a corresponding flat path of the stationary part 245. The said plate is forked at its forward end forming a frame which is open toward the center of the machine, under the head of the pincers catcher. The pincers pass through this forked frame in their outermost position, being guided by the side cheeks of the frame which is somewhat enlarged at the place of entrance for that purpose. The back 247 of the frame serves as abutment for the pincers and recoils with the pincers catcher 244 during the last portion of the outward travel of the pincers against the pressure of a spring 248 which encircles the bolt 249 screwed into the catcher, and bears against the pressure plate 250 attached to the part 245. The two nuts 251 on the bolt 249 serve to adjust the catcher in its position toward the center of the machine and thereby to regulate within small limits the time during which the pincers remains under the catcher.

Within the frame of the guide plate 246 is screwed onto the head of the pincers catchers a mouth piece 252 against which the head of the pincers strikes during its ingress. When the pincers come against the back 247 of the guiding frame, the holes provided in the pincers jaw 8 for the hammers 80 register with the openings 253 of the mouthpiece 252 which form continuations of the holes 254 of the catcher's head, into which holes the tubes 243 open. The fact that the pincers are laid by the pressure of the spring 248 on the back 247 and are in addition correctly secured in their position relatively to the pincers catchers, by the cheeks of the guide plate 246 insures a correct adjustment of the nail passage at the transition part from the catcher 244 to the pincers jaw 8.

*8. Starting and stopping the machine,* (Figs. 1 and 2.)—The driving of the main shaft 30 of the machine is effected by wheel gear mounted on the frame. On the main shaft is mounted the large toothed wheel 270 gearing with the pinion 271 keyed on the counter shaft 272. This shaft is journaled in the standard 2 and 3 and carries the friction clutch 273 and the pulley 274. The clutch is thrown into and out of gear by the axial displacement of the sleeve 275 on the shaft 272, which displacement is effected by the three arm lever 276 mounted in bearings 277 bolted to the standard 3. One arm carries at its free end on a pin 278 cheeks 279 embracing the sleeve which is shifted by an oscillating movement of the three arm lever. To the free end of the second arm is connected by a universal joint 280 a rod 281 running upward and connected by a ball joint 282 to a bent lever 283 keyed on the spindle 284. This spindle is pivotally journaled in bearings 285, bolted to the standard 3 and carries at the end toward the center of the machine the hand lever 286 (Fig. 2) keyed thereon. When the operator depresses this lever, he thereby shifts the coupling sleeve 275 to the right and throws the machine into gear. The machine will continue to remain in gear when the lever 286 is released by means of the following arrangement: The third arm of the lever 276 extends inwardly along the standard 3 and carries at its free end a pin 287 provided with a roller 288 which runs on a cam disk 289 secured to the main shaft 30. This disk which is circular is provided with a recess into which the roller 288 can be drawn by two springs 290 (Fig. 2). The springs 290 are attached at their lower ends to two bent arms 291 of the three arm lever 276 and at their upper ends to the standards 3. They are put under tension by the operator depressing the hand lever 286 when the roller 288 runs on the circular path of the cam disk 289 and keeps the three arm lever in the position given to it by the hand lever, the springs 290 remaining under tension. As soon however as the roller 288 leaves the circular part of the disk 289 the springs pull back the three arm lever and throw the machine out of gear. This occurs at the moment in which the pincers in their inward movement reckoned from the feeding in of the nail, reach the position which corresponds to the greatest width of last in use. The curve on the cam disk 289 is so shaped that the clutch is not at once completely released, but begins to act at the moment just mentioned with a tension sufficient to produce a small resistance which will bring the main shaft 30 to immediate rest. The clutch is perfectly released in that position of the pincers inward movement which corresponds to the least width of the lasts in use.

The intermediate positions are secured by a locking device in the following manner:— On the main shaft 30 adjacent to standard 3 is mounted a disk 292 provided with a locking tooth 293. On the boss of the disk 292 is pivotally mounted a crank arm 294 to which a locking pawl 296 is connected by a pin 295. On a second pin 297 of the crank 294 a rod 298 is pivotally mounted, which rod is provided at its upper end with a right-hand thread and a hand wheel 299 acting as nut. This hand wheel bears on the upper face of the boss of a bearing 300 bolted to the table 4, while a spring 301 bears on the lower face of the boss, the spring pressing the rod 298 by means of the collar 302 in a downward direction with such a force that the hand wheel 299 can never be lifted off the surface on which it rests. Consequently by turning the hand wheel to the right the crank arm is turned by the rod 298 toward the operator, whereas by turning the hand wheel to the left, the crank arm is turned away from the operator, the point of the locking pawl 296 oscillating through a definite angular path relatively to the main shaft 30. In its middle position the point of the locking pawl, looked at in a horizontal direction, comes on the axis of the coupling rod 281 which latter passes exactly through the center of the main shaft 30 and that of the counter shaft 272. The point of the locking pawl 296 is connected by means of a pin 303 to a second rod 304 which is connected at its upper end to the pin 305 of the clamping piece 306 and is thus coupled with the rod 281.

When throwing the clutch 273 into gear the operator presses on the hand lever 286, thereby drawing the coupling rod 281 upward and raising the pawl 296 by means of the coupling rod 304 to such a height that the locking disk 292 is free to move under and past the point of the pawl. The pawl remains in this position as long as the roller 288 runs on the circular part of the cam disk 289. If however the roller moves toward the center of the shaft 30, the pawl 296 drops into the gap provided in front of the locking tooth 293 of the locking disk 292, this gap having sufficient longitudinal extension, to bring the machine to rest as soon as the gap again meets the locking tooth 293. As the position of the point 296 of the pawl can be altered by means of the hand wheel 299, the tooth 293 is caused to reach the pawl 296 sooner or later according to the adjustment, and the machine comes to rest sooner or later accordingly.

The screw thread provided on the adjusting rod 298 is such that a full rotation of the hand wheel 299 provides sufficient adjustment for all sizes of lasts. To enable the operator to adjust the machine rapidly and correctly notches are provided on the hand wheel 299, each notch having appended to it the size of the corresponding last and engaging with a light spring catch 307 so that the wheel is arrested in the corresponding position. This arresting device does not prevent the hand wheel being readily turned in either a forward or backward direction.

Having thus fully described our invention, what we claim is:

1. In a machine of the character described a sole presser arranged to be actuated manually according to the judgment of the workman, pincers for pulling and gripping the upper, and automatic means arranged to be thrown into gear at will for moving the pincers inwardly to lay the upper around the edges of the last.

2. In a machine of the character described, a sole presser arranged to be actuated manually according to the judgment of the workman, pincers for pulling and gripping the upper, automatic means arranged to be thrown into gear at will for moving the pincers inwardly to lay the upper around the edge of the last, and automatic means for feeding pegs and inserting the same into the edges of the shoe.

3. In a machine of the character described a sole presser arranged to be actuated manually according to the judgment of the workman, a foot lever and pincers adapted to be opened by said foot lever and to be closed automatically for gripping the upper.

4. In a machine of the character described, a sole presser arranged to be actuated according to the judgment of the workman for stretching the upper over the surface of the last, and means for reducing the resistance offered by the said sole presser to the downward movement of the last.

5. In a machine of the character described, means adapted to be actuated according to the judgment of the workman for stretching the upper over the surface of the last, and a device arranged to act automatically to reduce the resistance offered to the downward movement of the last.

6. In a machine of the character described, a sole presser arranged to be actuated according to the judgment of the workman for stretching the upper over the surface of the last, a device adapted for locking the said sole presser, and automatic means for reducing the resistance offered by the sole presser to the downward movement of the last.

7. In a machine of the character described, a sole presser, a device adapted for locking the said sole presser, a cam, a cam lever, and a spring connecting this lever with the said locking means.

8. In a machine of the character described, a sole presser, means for locking the said sole presser, means for reducing the resistance offered by the sole presser to the downward movement of the last, and means for releasing the said locking device.

9. In a machine of the character described, a sole presser carried on a bar, a heel support arranged to be moved along this bar, two double-armed levers, links connecting the outer arms of the levers with the ends of said bar, and a push-rod jointed to the inner arms of the said levers.

10. In a machine of the character described, pincers for holding the upper, a spring attached to the fixed jaw of the said pincers, links connecting the free end of the said spring to the body of the pincers, a push-rod, a crank connecting said push-rod to the free end of the spring, and couplers connecting the said crank to the movable jaw of the pincers.

11. In a machine of the character described, pincers, a pincers-driver adapted to have motion relative to the pincers, a spring bearing against said pincers, a rod pivoted to such pincers and adjustable on the said rod, links connecting the said slide and the pincers-driver, a block through which the free end of the said rod passes, and a sleeve arranged at the free end of the said rod and adapted to be adjusted thereon.

12. In a machine of the character described, pincers, a pincers-driver adapted to have motion relative to the said pincers, a spindle pivoted to the pincers, a slide adjustable on the said rod, a spring bearing against the pincers, and links connecting the said slide to the pincers-driver.

13. In a machine of the character described, a sole presser arranged to be actuated according to the judgment of the workman, pincers for engaging the upper on opposite sides of the last, and means for moving the said pincers independently of each other in the longitudinal direction of the last for adjusting the upper while being stretched.

14. In a machine of the character described, pincers for engaging the upper on opposite sides of the last, spindles for supporting the pincers, levers for moving the pincers independently of each other along the said spindles in the longitudinal direction of the last, cams and rollers, and levers connected to the said cams for automatically returning the pincers to their normal positions at the end of the cycle of operations of the machine.

15. In a machine of the character described, pincers for engaging the upper on opposite sides of the last, means for imparting to the pincers a movement in the longitudinal direction of the last independently of each other, a cam, levers, and push-rod for moving the pincers inwardly under the sole of the last.

16. In a machine of the character described, pincers for engaging the upper on opposite sides of the last, means for moving said pincers independently of each other in the longitudinal direction of the last, means for moving the same in the transverse direction of the last, means for centering the pincers in the longitudinal direction of the last at the end of each cycle of operations of the machine, and an adjustable sleeve connecting the said means for the transverse movement of the pincers, and the means for centering of the latter.

17. In a machine of the character described, pincers for engaging the upper on opposite sides of the last, a clutch automatically operated and adapted to stop the machine with the pincers at rest in a definite position, a disk having a recess on its circumference and a pawl engaging said recess for actuating the clutch, and means for moving the said pincers in the longitudinal direction of the last independently of each other.

RUDOLF ERNST CRAIN.
FRANZ JOSEPH SCHARHAG.

Witnesses:
JEAN GRUND,
CHARLES JUNGE.